United States Patent
Shimano et al.

(10) Patent No.: US 9,231,516 B2
(45) Date of Patent: Jan. 5, 2016

(54) CONTROL DEVICE FOR GENERATOR-MOTOR AND CONTROL METHOD FOR GENERATOR-MOTOR

(71) Applicants: Tomoaki Shimano, Tokyo (JP); Masahiko Fujita, Tokyo (JP)

(72) Inventors: Tomoaki Shimano, Tokyo (JP); Masahiko Fujita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 534 days.

(21) Appl. No.: 13/680,487

(22) Filed: Nov. 19, 2012

(65) Prior Publication Data
US 2014/0001841 A1 Jan. 2, 2014

(30) Foreign Application Priority Data
Jul. 2, 2012 (JP) .................. 2012-148210

(51) Int. Cl.
H02P 31/00 (2006.01)
F02N 11/04 (2006.01)
H02P 9/30 (2006.01)
F02N 11/08 (2006.01)
F02N 11/10 (2006.01)

(52) U.S. Cl.
CPC ............... *H02P 31/00* (2013.01); *F02N 11/04* (2013.01); *H02P 9/302* (2013.01); *F02N 11/087* (2013.01); *F02N 11/10* (2013.01); *F02N 2011/0896* (2013.01)

(58) Field of Classification Search
CPC ......... H02P 31/00; H01P 9/302; F02N 11/04; F02N 2011/0896; F02N 11/10; F02N 11/087
USPC .......................................... 307/10.1
See application file for complete search history.

(56) References Cited

U.S. PATENT DOCUMENTS

2005/0269981 A1* 12/2005 Sakurai .................. 318/139
2010/0051363 A1* 3/2010 Inoue et al. .............. 180/65.26
2011/0227540 A1* 9/2011 Kanoh et al. .............. 320/135

FOREIGN PATENT DOCUMENTS

| JP | 09-163793 A | 6/1997 |
| JP | 2001-037275 A | 2/2001 |
| JP | 2003-061399 A | 2/2003 |

(Continued)

OTHER PUBLICATIONS

Japanese Office Action (Preliminary Notice of Reasons for Rejection), mailed Oct. 15, 2013, Patent Application No. 2012-148210.

(Continued)

*Primary Examiner* — Rexford Barnie
*Assistant Examiner* — Toan Vu
(74) *Attorney, Agent, or Firm* — Sughrue Mion, PLLC; Richard C. Turner

(57) ABSTRACT

Provided is a control device for a generator-motor including: a control section (111) for controlling a rotary electric machine (12) with use of an inverter (11); and a connection switch section (5) provided between a power source and the inverter, the connection switch section including a change-over contact (51) which is ON/OFF-controllable by the control section and a current reducing resistor (52) which are connected in parallel. The control section performs ON/OFF control of the change-over contact in accordance with drive characteristics of the rotary electric machine so that a drive current that flows when the rotary electric machine operates as a motor falls within a range not exceeding a permissible current value of the rotary electric machine.

11 Claims, 7 Drawing Sheets

(56) References Cited

FOREIGN PATENT DOCUMENTS

| | | |
|---|---|---|
| JP | 2003-113763 A | 4/2003 |
| JP | 2006-200404 A | 8/2006 |

OTHER PUBLICATIONS

Japanese Office Action (Preliminary Notice of Reasons for Rejection), mailed Feb. 4, 2014, Patent Application No. 2012-148210.

* cited by examiner

CONTROL DEVICE FOR GENERATOR-MOTOR AND CONTROL METHOD FOR GENERATOR-MOTOR

BACKGROUND OF THE INVENTION

1. Field of the Invention

The present invention relates to a control device and a control method for a generator-motor which is mainly mounted on a vehicle and operates also as a motor when starting an engine and assisting torque.

2. Description of the Related Art

In recent years, for the purpose of improving fuel consumption and adapting to environmental standards, there has been developed a vehicle having a generator-motor mounted thereon to employ so-called idle reduction, which stops an engine when the vehicle stops and restarts the engine when starting the vehicle. The generator-motor for such a vehicle is required to be small in size, low in cost, and high in efficiency, and hence a current reducing resistor is not often provided between a power source and the generator-motor (see, for example, Japanese Patent Application Laid-open No. 2003-113763).

However, the conventional technology has the following problems.

In such an idle reduction system using a generator-motor, there is a case where the generator-motor is driven with a high voltage in order to secure torque necessary for starting an engine. In this case, there is a problem in that a current value immediately after the driving exceeds a permissible value of the generator-motor. Further, if the number of parallel-connected semiconductors is increased in order to increase the current permissible value of the generator-motor, the size and cost increase. In addition, an excess current leads to an excess torque, and hence there is a problem in that a belt slips and energy accumulated by power generation becomes waste.

SUMMARY OF THE INVENTION

The present invention has been made in order to solve the above-mentioned problems, and it is an object thereof to provide a relatively inexpensive control device for a generator-motor and a relatively inexpensive control method for a generator-motor, which are capable of suppressing a drive current within a permissible range of the generator-motor while securing torque necessary for driving.

According to an exemplary embodiment of the present invention, there is provided a control device for a generator-motor including: a rotary electric machine; an inverter; and a control section for controlling the rotary electric machine with use of the inverter, the control section being configured to control the inverter so that the rotary electric machine operates as a motor one of when starting a vehicle load and when assisting torque, and control the inverter so that the rotary electric machine operates as a generator during operation of the vehicle load so as to supply generated power to a power source, the control device including a connection switch section provided between the power source and the inverter, the connection switch section including a change-over contact which is ON/OFF-controllable by the control section and a current reducing resistor, the change-over contact and the current reducing resistor being connected in parallel, in which the control section performs ON/OFF control of the change-over contact in accordance with drive characteristics of the rotary electric machine so that a drive current that flows when the rotary electric machine operates as the motor falls within a range not exceeding a permissible current value of the rotary electric machine.

According to an exemplary embodiment of the present invention, there is provided a control method for a generator-motor, the generator-motor including: a rotary electric machine; an inverter; and a control section for controlling the rotary electric machine with use of the inverter, the control section being configured to control the inverter so that the rotary electric machine operates as a motor one of when starting a vehicle load and when assisting torque, and control the inverter so that the rotary electric machine operates as a generator during operation of the vehicle load so as to supply generated power to a power source, the power source and the inverter being connected to a connection switch section including a change-over contact which is ON/OFF-controllable by the control section and a current reducing resistor, the change-over contact and the current reducing resistor being connected in parallel, the control method including: controlling, by the control section, in a case where the control section determines that a drive current that flows when the rotary electric machine operates as the motor exceeds a permissible current value of the rotary electric machine in accordance with drive characteristics of the rotary electric machine, the change-over contact so as to be turned OFF to form an electric circuit through which a current flows to the rotary electric machine from the power source via the current reducing resistor; and controlling, by the control section, in a case where the control section determines that the drive current that flows when the rotary electric machine operates as the motor does not exceed the permissible current value of the rotary electric machine in accordance with the drive characteristics of the rotary electric machine, the change-over contact so as to be turned ON to form an electric circuit through which a current flows to the rotary electric machine from the power source not via the current reducing resistor.

According to the control device for a generator-motor and the control method for a generator-motor of the present invention, the connection switch section which is formed of a parallel circuit including the change-over contact and the current reducing resistor is provided between the generator-motor and the power source, and ON/OFF of the change-over contact is controlled in accordance with the drive characteristics of the generator-motor so that the drive current is used in a range not exceeding the permissible current value of the generator-motor. Therefore, a relatively inexpensive control device for a generator-motor and a relatively inexpensive control method for a generator-motor can be obtained, which are capable of suppressing the drive current within the permissible range of the generator-motor while securing torque necessary for driving.

DETAILED DESCRIPTION OF THE PREFERRED EMBODIMENTS

Referring to the accompanying drawings, a control device for a generator-motor and a control method for a generator-motor according to exemplary embodiments of the present invention are described below.

First Embodiment

Now, a first embodiment of the present invention is described with reference to the accompanying drawings.

Figure 1:
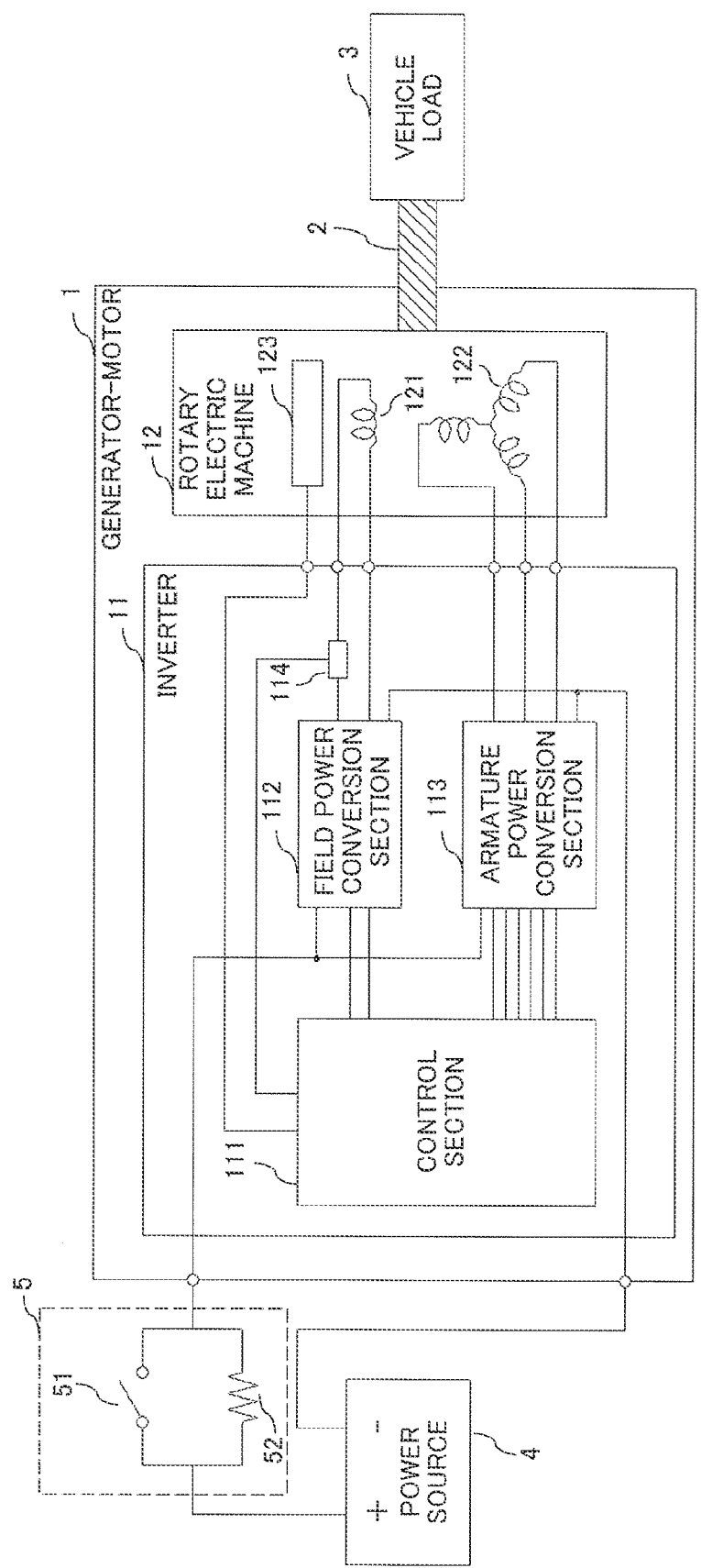
FIG. 1 is an overall configuration diagram of a vehicle system having a generator-motor mounted thereon according to a first embodiment of the present invention.

FIG. 1 is an overall configuration diagram of a vehicle system having a generator-motor 1 mounted thereon according to the first embodiment of the present invention. In FIG. 1, the generator-motor 1 is connected to, for example, a vehicle load 3 via power transmission means 2 such as a belt.

When starting the vehicle load 3 such as an engine, the generator-motor 1 operates as a motor to rotate the vehicle load 3. During the operation of the vehicle load 3, on the other hand, the generator-motor 1 operates as a generator to supply generated power to a power source 4 and charge the power source 4 to a predetermined voltage, or operates as a motor to assist torque.

In any case, although omitted in FIG. 1, the generator-motor 1 is given an instruction of an operation mode through a controller of an external idle reduction system or a key switch, and the generator-motor 1 performs an operation in accordance with the instruction.

Next, an internal configuration of the generator-motor illustrated in FIG. 1 is described. The generator-motor 1 illustrated in FIG. 1 includes an inverter 11 and a rotary electric machine 12. The inverter 11 includes a control section 111, a field power conversion section 112, an armature power conversion section 113, and a field current sensor 114.

The control section 111 issues an ON/OFF instruction for power conversion elements of the field power conversion section 112 and the armature power conversion section 113. The field current sensor 114 is a sensor for detecting a field current.

The rotary electric machine 12, on the other hand, includes a field coil 121 which is supplied with the field current to generate a field magnetic flux, an armature coil 122, and a rotary sensor 123. Note that, this circuit configuration itself is a known technology, and more detailed description thereof is therefore omitted.

The field power conversion section 112 operates in response to the ON/OFF instruction for the power conversion element issued from the control section 111, and supplies a field current to the field coil 121. In general, the field power conversion section 112 uses a half-bridge circuit formed of MOSFETs.

In driving, the armature power conversion section 113 operates in response to the ON/OFF instruction for the power conversion element issued from the control section 111, and supplies an armature current to the armature coil 122. In generating power, on the other hand, the armature power conversion section 113 rectifies the armature current from the armature coil 122, and supplies power to the power source 4 and another load. In general, the armature power conversion section 113 uses a three-phase bridge circuit formed of MOSFETs.

A control device for a generator-motor according to the first embodiment has technical features that a connection switch section 5 in which a mechanical switch 51 having a change-over contact and a current reducing resistor 52 are connected in parallel is provided between the generator-motor 1 and the power source 4 and that the connection switch section 5 is controlled by the control section 111. Owing to the technical features, a drive current that flows when the generator-motor 1 is used as a motor can be suppressed within a permissible current range of the generator-motor 1.

Figure 2:
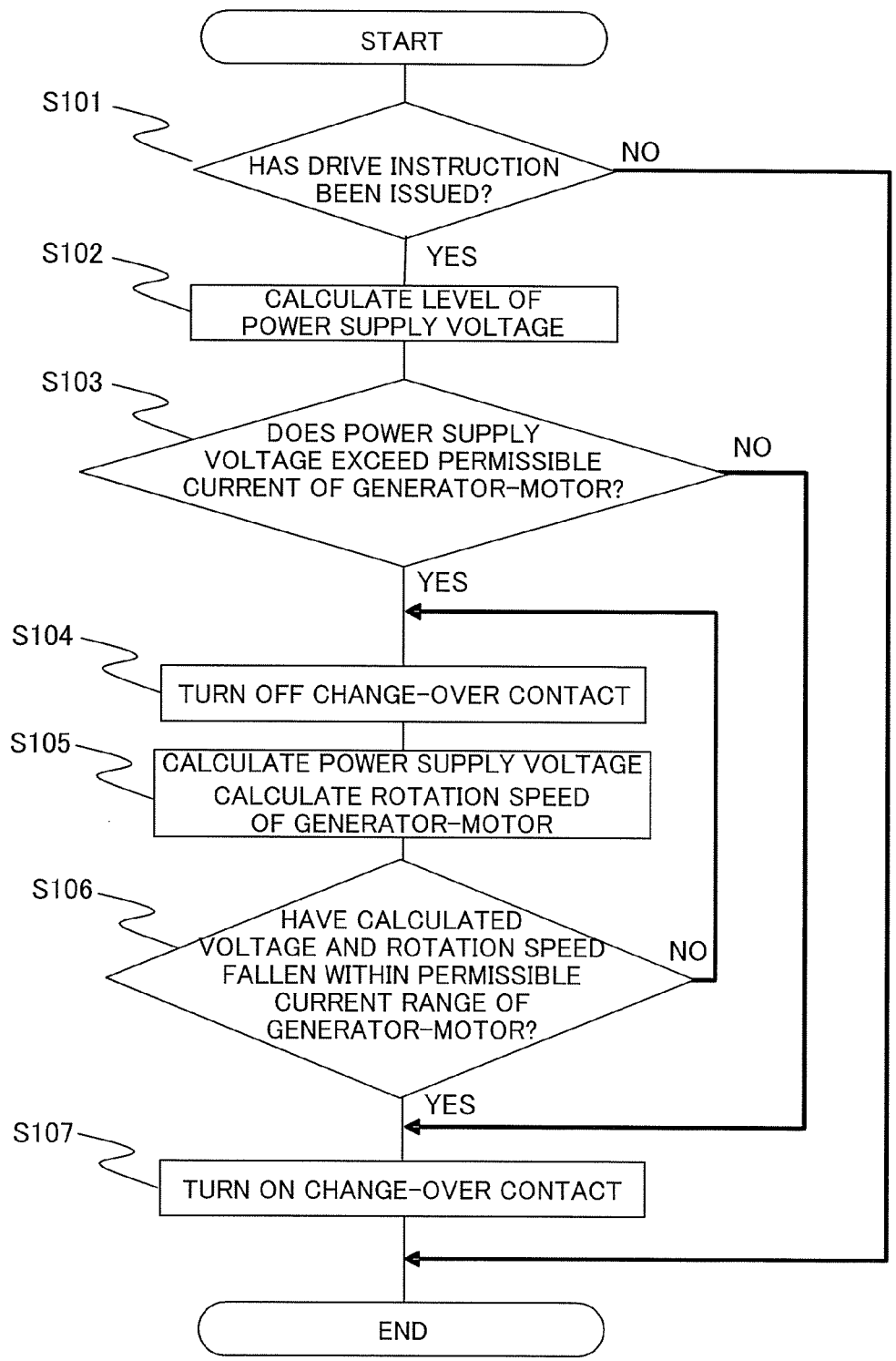
FIG. 2 is a flowchart illustrating a series of drive processing of a control device for a generator-motor according to the first embodiment of the present invention.

Next, a series of operations of the control device for a generator-motor according to the first embodiment is described. FIG. 2 is a flowchart illustrating a series of drive processing of the control device for a generator-motor according to the first embodiment of the present invention.

First, in Step S101, the control section 111 determines whether or not a drive instruction has been issued from the controller of the idle reduction system, the key switch, or the like. When a drive instruction has been issued, the processing proceeds to Step S102 and subsequent steps. When a drive instruction has not been issued, on the other hand, a series of processing is ended because the drive processing is not performed.

Although omitted in the flowchart illustrated in FIG. 2, even when a drive instruction has been issued, the drive processing is not performed in the case where the state of the generator-motor 1 is abnormal or in the case where a power supply voltage of the power source 4 is outside a specified range.

In the case where the processing proceeds to Step S102, the control section 111 calculates the power supply voltage of the power source 4. Note that, although omitted in FIG. 1, the control section 111 is connected to a circuit for reading the power supply voltage of the power source 4.

Then, in Step S103, the control section 111 determines the level of the power supply voltage calculated in Step S102. In this case, the voltage of the power source 4 varies depending on the vehicle state. Therefore, in the case where the control section 111 determines that the power supply voltage is high and a current exceeding a permissible value of the generator-motor 1 flows under the state in which the mechanical switch 51 provided between the power source 4 and the generator-motor 1 is ON, the control section 111 controls the connection switch section 5 so that the mechanical switch 51 may be turned OFF to form an electric circuit through which a current flows to the generator-motor 1 via the current reducing resistor 52.

On the other hand, in the case where the control section 111 determines that the power supply voltage is not so high and a current exceeding the permissible value of the generator-motor 1 does not flow even under the state in which the mechanical switch 51 provided between the power source 4 and the generator-motor 1 is ON, the control section 111 controls the connection switch section 5 so that the mechanical switch 51 may be turned ON to form an electric circuit through which a current mainly flows to the generator-motor 1 not via the current reducing resistor 52.

Now, a specific method of determining ON/OFF of the mechanical switch 51 is described. As described above, the voltage of the power source 4 varies depending on the vehicle state. It is therefore necessary to know in advance drive characteristics of the generator-motor 1 in a voltage range and a rotation speed range to be used.

Specifically, an ON/OFF determination map is obtained in advance from the voltage and the rotation speed based on the drive characteristics of the generator-motor 1, in which the mechanical switch 51 is to be turned OFF in the case where the drive current exceeds the permissible current value of the generator-motor 1 under the state in which the mechanical switch 51 is ON, whereas the mechanical switch 51 is to be turned ON in the case where the drive current does not exceed the permissible current value of the generator-motor 1 even under the state in which the mechanical switch 51 is ON.

Then, the control section 111 refers to the ON/OFF determination map which has been obtained in advance based on the power supply voltage and the rotation speed, to thereby determine ON/OFF of the mechanical switch 51 provided between the power source 4 and the generator-motor 1. This control of the connection switch section 5 performed by the control section 111 is described with reference to the flowchart of FIG. 2 again. Note that, although omitted in FIG. 1, the control section 111 is connected to a circuit for reading the rotation speed of the generator-motor 1.

In the case where it is determined in Step S103 that the level of the power supply voltage calculated in Step S102 will exceed a permissible current of the generator-motor 1 and the processing then proceeds to Step S104, the control section 111 turns OFF the change-over contact of the mechanical switch 51. In this manner, immediately after the driving of the generator-motor 1, the control section 111 forms an electric circuit so that a current flows to the generator-motor via the current reducing resistor 52 under the state in which the mechanical switch 51 is OFF.

After that, in Step S105, the control section 111 calculates the voltage of the power source 4 and the rotation speed of the generator-motor 1. Further, in Step S106, the control section 111 determines whether or not the calculated power supply voltage and rotation speed have satisfied the condition that the drive current falls within the permissible current range of the generator-motor 1 on the ON/OFF determination map.

Then, the control section 111 repeats the processing of Steps S104 to S106 until the calculated power supply voltage and rotation speed satisfy the condition that the drive current falls within the permissible current range of the generator-motor 1. On the other hand, at the time when the calculated power supply voltage and rotation speed have satisfied the condition that the drive current falls within the permissible current range of the generator-motor 1, the control section 111 proceeds to Step S107 to switch the change-over contact of the mechanical switch 51 from OFF to ON, to thereby form an electric circuit so that a current mainly flows to the generator-motor 1 not via the current reducing resistor 52. Then, a series of processing is ended.

Note that, also in the case where it is determined in Step S103 that the level of the power supply voltage calculated in Step S102 will not exceed the permissible current of the generator-motor 1, the control section 111 proceeds to Step S107 to switch the change-over contact of the mechanical switch 51 from OFF to ON, to thereby form an electric circuit so that a current mainly flows to the generator-motor 1 not via the current reducing resistor 52. Then, a series of processing is ended.

Figure 3:
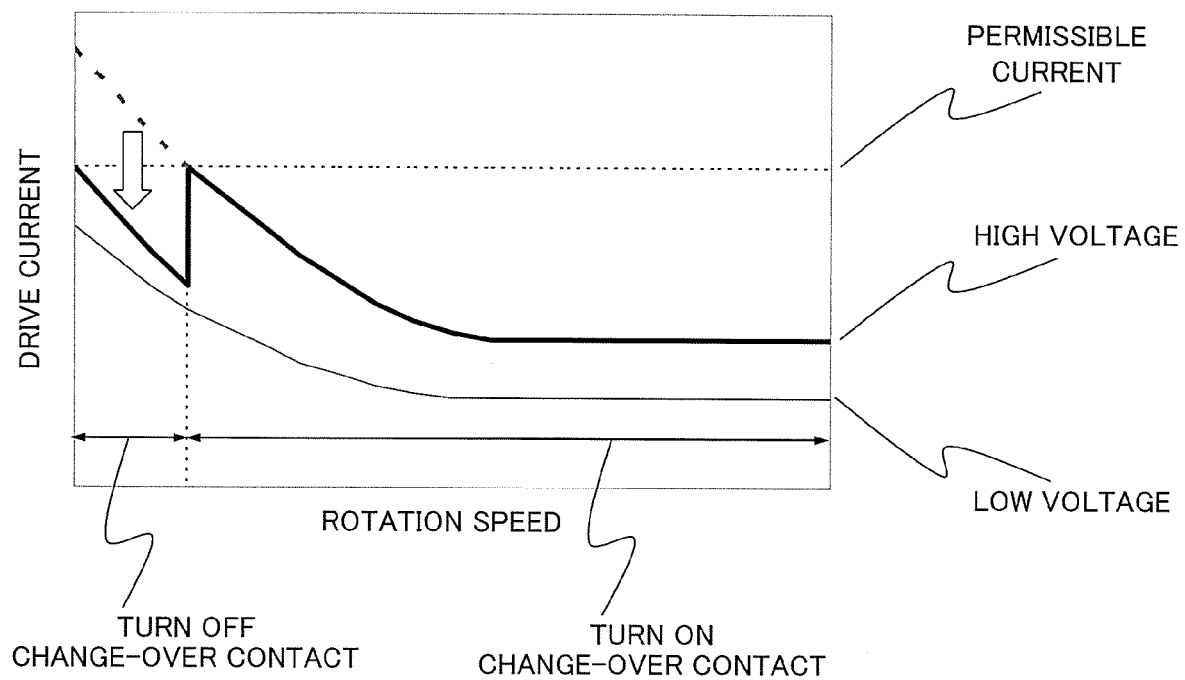
FIG. 3 is a graph showing a relationship between an r.p.m. and a drive current of the generator-motor in the control device for a generator-motor according to the first embodiment of the present invention.

FIG. 3 is a graph showing a relationship between the rotation speed and the drive current of the generator-motor 1 (that is, drive characteristics inherent in a generator-motor) in the control device for a generator-motor according to the first embodiment of the present invention. According to the first embodiment, in the case where the power source 4 has a high voltage and the generator-motor 1 rotates at a low speed, the mechanical switch 51 provided between the power source 4 and the generator-motor 1 is turned OFF. As a result, an electric circuit is formed so that a current flows via the current reducing resistor 52. In this manner, the drive current can be suppressed within the permissible current range of the generator-motor 1.

As described above, according to the first embodiment, the mechanical switch provided between the power source and the generator-motor is ON/OFF-controlled in accordance with the power supply voltage and the rotation speed of the generator-motor. Therefore, the starting of the vehicle load such as an engine and the torque assist can be performed by the generator-motor while the drive current is prevented from exceeding the permissible current value of the generator-motor.

In addition, the voltage of the power source and the rotation speed of the generator-motor which correspond to the permissible current range are grasped based on individual drive characteristics of the generator-motor to thereby create the ON/OFF determination map in advance. Therefore, the generator-motor can be driven within the permissible current range reliably.

Second Embodiment

A second embodiment of the present invention is different from the first embodiment in that, in the case where the generator-motor 1 is used as a generator, the mechanical switch 51 provided between the power source 4 and the generator-motor 1 is always turned ON, but otherwise is the same as in the first embodiment, and hence the difference is mainly described below.

In the case where the generator-motor 1 is used as a generator, the ON/OFF determination map, which is set in the case where the generator-motor 1 is used as a motor, is unnecessary. In other words, in the case where the generator-motor 1 is used as a generator, the mechanical switch 51 is always turned ON to form an electric circuit through which a current flows mainly via the mechanical switch 51. Thus, the charge can be performed efficiently.

As described above, according to the second embodiment, in addition to the effect of the first embodiment, in the case where the generator-motor 1 is used as a generator, the charge can be performed efficiently by always turning ON the mechanical switch provided between the power source and the generator-motor.

Third Embodiment

A third embodiment of the present invention is different from the first embodiment in that the ON/OFF determination condition of the mechanical switch 51 provided between the power source 4 and the generator-motor 1 is changed, but otherwise is the same as in the first embodiment, and hence the difference is mainly described below.

Figure 4:
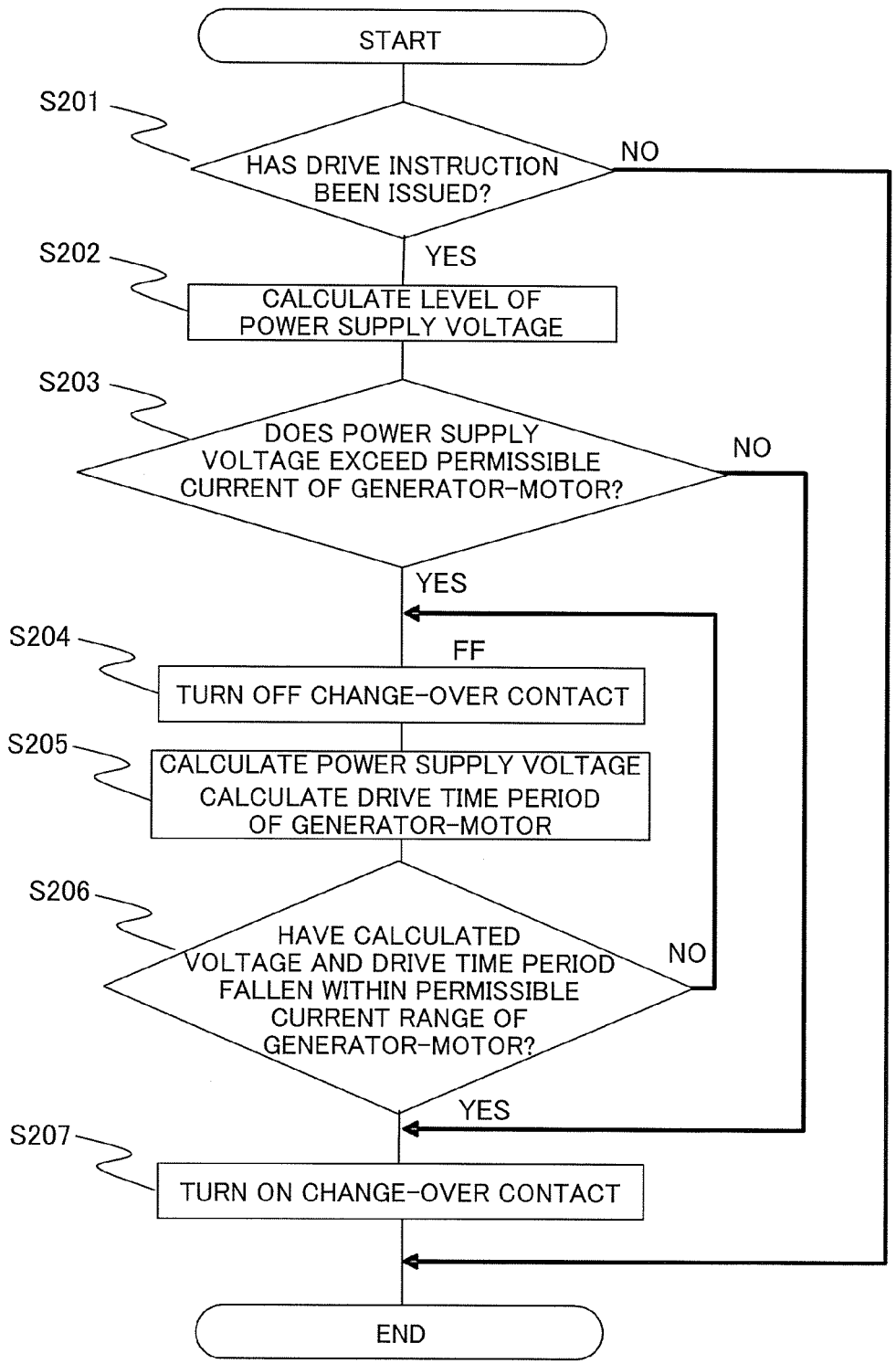
FIG. 4 is a flowchart illustrating a series of drive processing of a control device for a generator-motor according to a third embodiment of the present invention.

FIG. 4 is a flowchart illustrating a series of drive processing of a control device for a generator-motor according to the third embodiment of the present invention. The flowchart of FIG. 4 is different from the flowchart illustrated in FIG. 2 of the first embodiment in that Step S206 is used instead of Step S106. The other Steps S201 to S205 and S207 are identical with Steps S101 to S105 and S107 of FIG. 2 described above.

More specifically, in the first embodiment, the ON/OFF determination map based on the relationship between the voltage and the rotation speed as the drive characteristics of the generator-motor 1 is used to determine a timing of switching the change-over contact from OFF to ON. In the third embodiment, on the other hand, an ON/OFF determination map which is created by using a drive time period of the generator-motor 1 instead of using the rotation speed is used to determine a timing of switching the change-over contact from OFF to ON.

In the third embodiment, an ON/OFF determination map is obtained in advance from the voltage and the drive time period based on the drive characteristics of the generator-motor 1, in which the mechanical switch 51 is to be turned OFF in the case where the drive current exceeds the permissible current value of the generator-motor 1 under the state in which the mechanical switch 51 is ON, whereas the mechanical switch 51 is to be turned ON in the case where the drive current does not exceed the permissible current value of the generator-motor 1 even under the state in which the mechanical switch 51 is ON.

Then, in Step S206, the control section 111 refers to the ON/OFF determination map which has been obtained in advance based on the power supply voltage and the drive time period, to thereby determine ON/OFF of the mechanical switch 51 provided between the power source 4 and the generator-motor 1.

As described above, according to the third embodiment, the same effects as in the first embodiment can be obtained even by using the ON/OFF determination map which is based on the power supply voltage and the drive time period instead of using the ON/OFF determination map which is based on the power supply voltage and the rotation speed.

Fourth Embodiment

Figure 5:
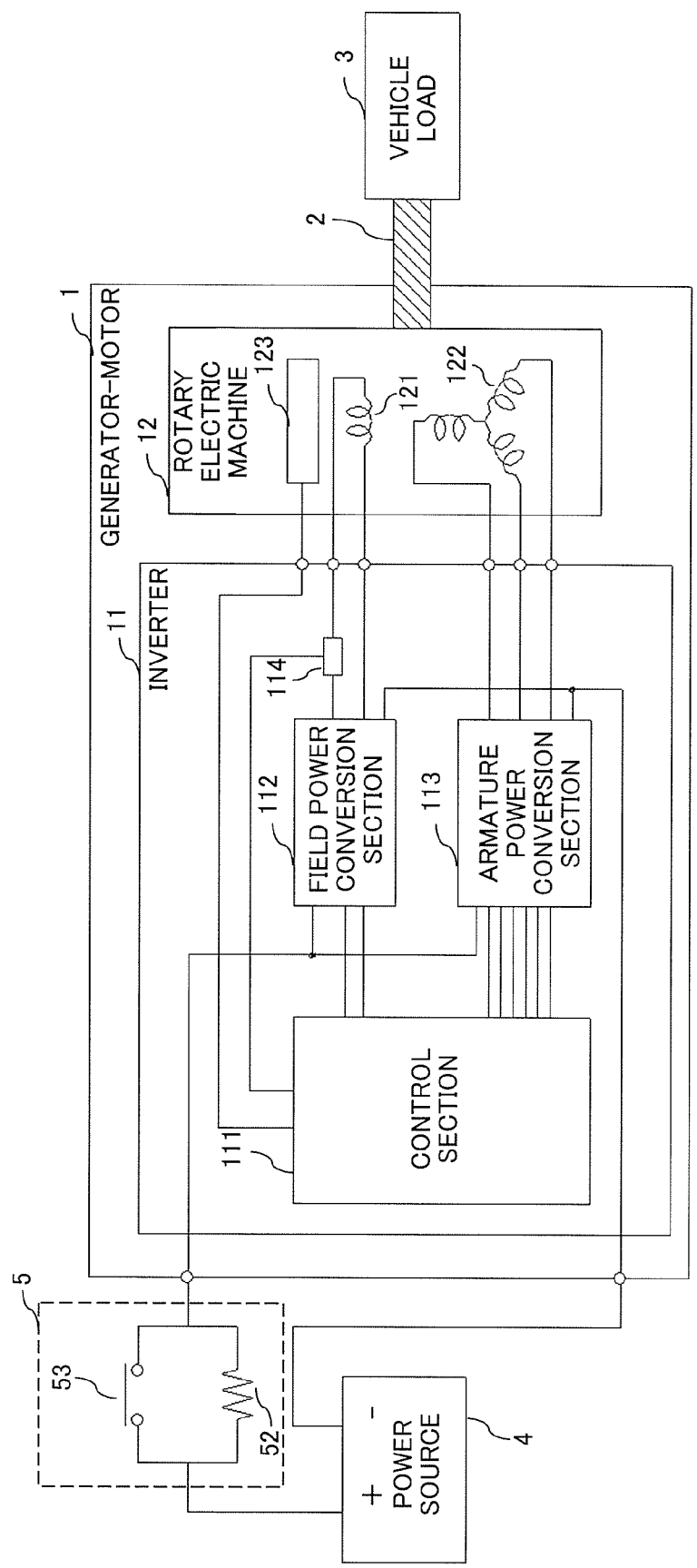
FIG. 5 is an overall configuration diagram of a vehicle system having a generator-motor mounted thereon according to a fourth embodiment of the present invention.

FIG. 5 is an overall configuration diagram of a vehicle system having a generator-motor 1 mounted thereon according to a fourth embodiment of the present invention. The fourth embodiment is different from the first to third embodiments in the configuration of the connection switch section 5 provided between the power source 4 and the generator-motor 1.

More specifically, in the configuration of FIG. 1 corresponding to the first to third embodiments, the connection switch section 5 includes the mechanical switch 51 having the change-over contact and the current reducing resistor 52 which are connected in parallel. In the fourth embodiment, on the other hand, as a change-over contact, a relay contact 53 is used instead of the mechanical switch 51. The use of the relay contact 53 instead of the mechanical switch 51 can improve the controllability.

As described above, according to the fourth embodiment, even when the relay contact is used as the configuration of the connection switch section instead of using the mechanical switch, the same effects as in the first to third embodiments can be obtained, and further, the controllability can be improved by using the relay contact.

Fifth Embodiment

Figure 6:
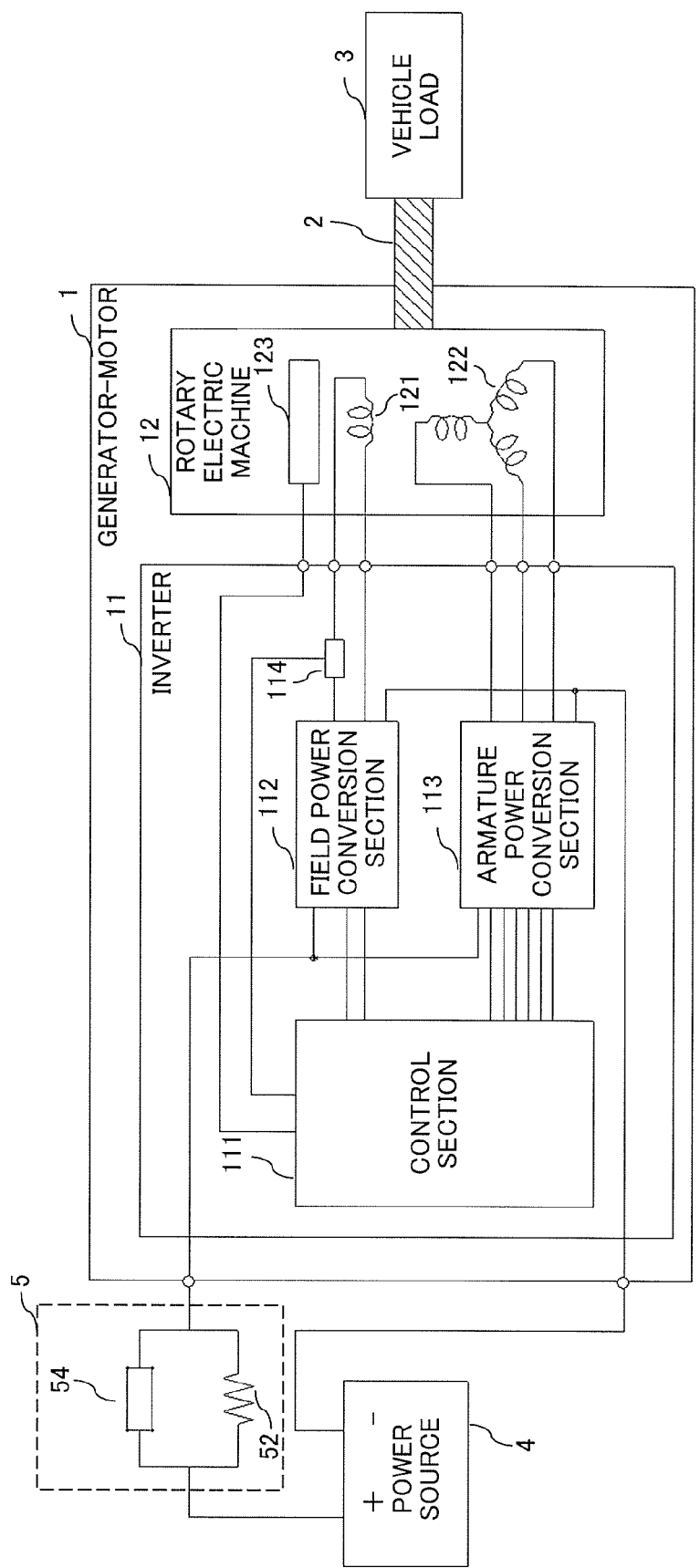
FIG. 6 is an overall configuration diagram of a vehicle system having a generator-motor mounted thereon according to a fifth embodiment of the present invention.

FIG. 6 is an overall configuration diagram of a vehicle system having a generator-motor 1 mounted thereon according to a fifth embodiment of the present invention. The fifth embodiment is different from the first to third embodiments and from the fourth embodiment in the configuration of the connection switch section 5 provided between the power source 4 and the generator-motor 1.

More specifically, in the configuration of FIG. 1 corresponding to the first to third embodiments, the connection switch section 5 includes the mechanical switch 51 having the change-over contact and the current reducing resistor 52 which are connected in parallel. Further, in the configuration of FIG. 5 corresponding to the fourth embodiment, the connection switch section 5 includes the relay contact 53 having the change-over contact and the current reducing resistor 52 which are connected in parallel.

In the fifth embodiment, on the other hand, as a change-over contact, a semiconductor switch 54 is used instead of the mechanical switch 51 and the relay contact 53. The use of the semiconductor switch 54 instead of the mechanical switch 51 and the relay contact 53 can improve the controllability.

As described above, according to the fifth embodiment, even when the semiconductor switch is used as the configuration of the connection switch section instead of using the mechanical switch and the relay contact, the same effects as in the first to fourth embodiments can be obtained, and further, the controllability can be improved by using the semiconductor switch.

Sixth Embodiment

Figure 7:
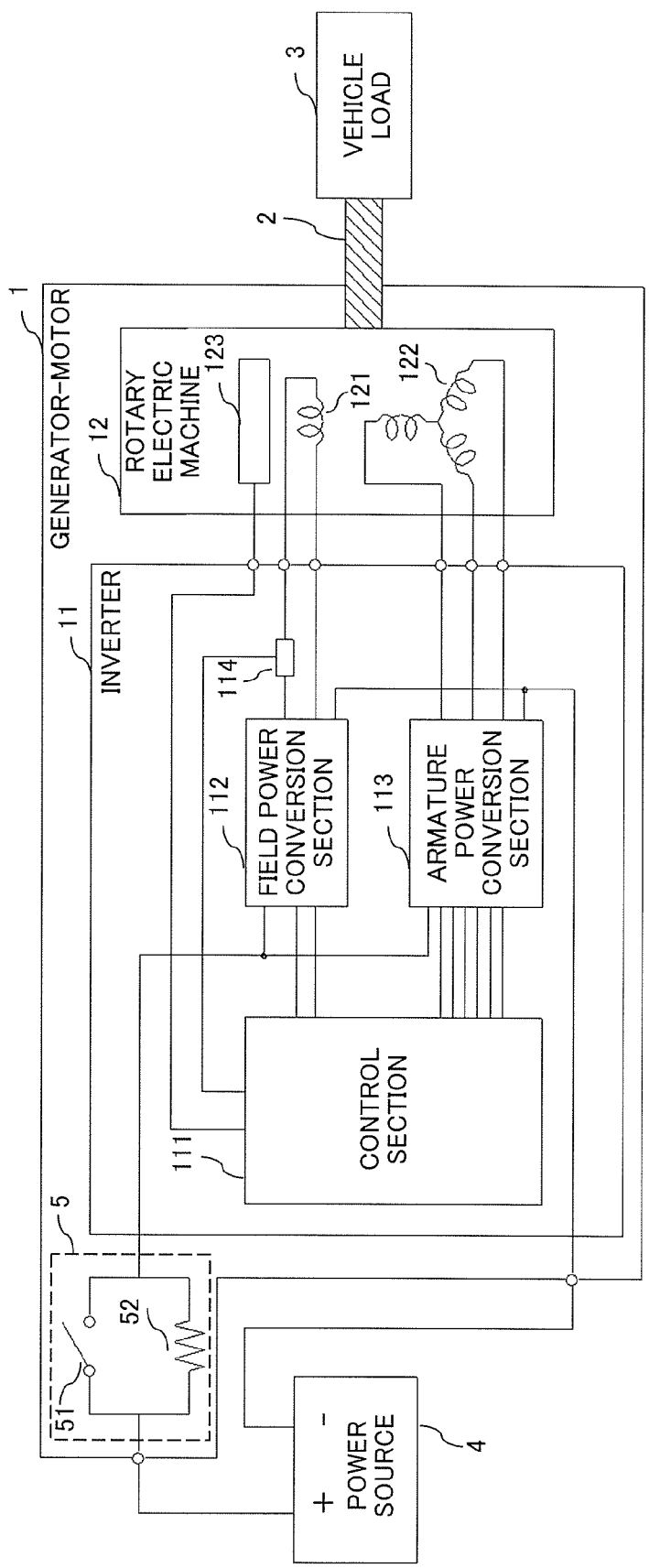
FIG. 7 is an overall configuration diagram of a vehicle system having a generator-motor mounted thereon according to a sixth embodiment of the present invention.

FIG. 7 is an overall configuration diagram of a vehicle system having a generator-motor 1 mounted thereon according to a sixth embodiment of the present invention. The sixth embodiment is different from the first to third embodiments in that the connection switch section 5 provided between the power source 4 and the generator-motor 1 is built in the generator-motor 1.

Note that, FIG. 7 exemplifies the configuration in which the connection switch section 5 illustrated in FIG. 1 is built in the generator-motor 1, but the connection switch section 5 illustrated in FIG. 5 or 6 may be built in the generator-motor 1. As a result, space-saving can be made, thus realizing the improvement in layout of a vehicle.

As described above, according to the sixth embodiment, even when the connection switch section is built in the generator-motor, the same effects as in the first to fifth embodiments can be obtained, and further, because the connection switch section is built in the generator-motor, space-saving can be made, thus realizing the improvement in layout of a vehicle.

What is claimed is:

1. A control device for a generator-motor, the generator-motor comprising:
a rotary electric machine;
an inverter; and
a control section configured to control the rotary electric machine with use of the inverter,
the control section being configured to control the inverter so that the rotary electric machine operates as a motor one of when starting a vehicle load and when assisting torque, and configured to control the inverter so that the rotary electric machine operates as a generator during operation of the vehicle load so as to supply generated power to a power source,
the control device comprising a connection switch section provided between the power source and the inverter, the connection switch section including a change-over contact which is ON/OFF-controllable by the control section and a current reducing resistor, the change-over contact and the current reducing resistor being connected in parallel,
wherein the control section is configured to perform ON/OFF control of the change-over contact in accordance with drive characteristics of the rotary electric machine so that a drive current that flows when the rotary electric machine operates as the motor falls within a range not exceeding a permissible current value of the rotary electric machine, wherein:

the control section comprises an ON/OFF determination map in association with a voltage of the power source and a rotation speed of the rotary electric machine based on the drive characteristics of the rotary electric machine, the ON/OFF determination map having an ON/OFF state set therein configured to control the change-over contact to be turned OFF in a case where the drive current exceeds the permissible current value of the rotary electric machine under a state in which the change-over contact is ON and configured to control the change-over contact to be turned ON in a case where the drive current does not exceed the permissible current value of the rotary electric machine even under the state in which the change-over contact is ON; and the control section is configured to extract, from the ON/OFF determination map, the ON/OFF state corresponding to the voltage and the rotation speed which have been read when the rotary electric machine operates as the motor, to thereby perform the ON/OFF control of the change-over contact.

2. A control device for a generator-motor according to claim 1, wherein the control section is configured to control the change-over contact so as to be always turned ON when the rotary electric machine operates as the generator.

3. A control device for a generator-motor according to claim 1, wherein the change-over contact comprises a relay contact.

4. A control device for a generator-motor according to claim 1, wherein the change-over contact comprises a semiconductor switch.

5. A control device for a generator-motor according to claim 1, wherein the connection switch section is built in the generator-motor.

6. A control device for a generator-motor, the generator-motor comprising:

a rotary electric machine;

an inverter; and a control section configured to control the rotary electric machine with use of the inverter, the control section being configured to control the inverter so that the rotary electric machine operates as a motor one of when starting a vehicle load and when assisting torque, and configured to control the inverter so that the rotary electric machine operates as a generator during operation of the vehicle load so as to supply generated power to a power source, the control device comprising a connection switch section provided between the power source and the inverter, the connection switch section including a change-over contact which is ON/OFF-controllable by the control section and a current reducing resistor, the change-over contact and the current reducing resistor being connected in parallel, wherein the control section is configured to perform ON/OFF control of the change-over contact in accordance with drive characteristics of the rotary electric machine so that a drive current that flows when the rotary electric machine operates as the motor falls within a range not exceeding a permissible current value of the rotary electric machine, wherein:

the control section comprises an ON/OFF determination map in association with a voltage of the power source and a drive time period of the rotary electric machine based on the drive characteristics of the rotary electric machine, the ON/OFF determination map having an ON/OFF state set therein configured to control the change-over contact to be turned OFF in a case where the drive current exceeds the permissible current value of the rotary electric machine under a state in which the change-over contact is ON and configured to control the change-over contact to be turned ON in a case where the drive current does not exceed the permissible current value of the rotary electric machine even under the state in which the change-over contact is ON; and the control section is configured to extract, from the ON/OFF determination map, the ON/OFF state corresponding to the voltage and the drive time period which have been read when the rotary electric machine operates as the motor, to thereby perform the ON/OFF control of the change-over contact.

7. A control device for a generator-motor according to claim 6, wherein the control section is configured to control the change-over contact so as to be always turned ON when the rotary electric machine operates as the generator.

8. A control device for a generator-motor according to claim 6, wherein the change-over contact comprises a relay contact.

9. A control device for a generator-motor according to claim 6, wherein the change-over contact comprises a semiconductor switch.

10. A control device for a generator-motor according to claim 6, wherein the connection switch section is built in the generator-motor.

11. A control method for a generator-motor having a rotary electric machine; an inverter; and a control section for controlling the rotary electric machine with use of the inverter, the control section being configured to control the inverter so that the rotary electric machine operates as a motor one of when starting a vehicle load and when assisting torque, and control the inverter so that the rotary electric machine operates as a generator during operation of the vehicle load so as to supply generated power to a power source, the power source and the inverter being connected to a connection switch section including a change-over contact which is ON/OFF-controllable by the control section and a current reducing resistor, the change-over contact and the current reducing resistor being connected in parallel, the control method comprising:

controlling, by the control section, in a case where the control section determines that a drive current that flows when the rotary electric machine operates as the motor exceeds a permissible current value of the rotary electric machine in accordance with drive characteristics of the rotary electric machine, the change-over contact so as to be turned OFF to form an electric circuit through which a current flows to the rotary electric machine from the power source via the current reducing resistor; and controlling, by the control section, in a case where the control section determines that the drive current that flows when the rotary electric machine operates as the motor does not exceed the permissible current value of the rotary electric machine in accordance with the drive characteristics of the rotary electric machine, the change-over contact so as to be turned ON to form an electric circuit through which a current flows to the rotary electric machine from the power source not via the current reducing resistor.

* * * * *